United States Patent
Tannenbaum et al.

(10) Patent No.: US 9,465,578 B2
(45) Date of Patent: Oct. 11, 2016

(54) LOGIC CIRCUITRY CONFIGURABLE TO PERFORM 32-BIT OR DUAL 16-BIT FLOATING-POINT OPERATIONS

(71) Applicant: NVIDIA Corporation, Santa Clara, CA (US)

(72) Inventors: David C. Tannenbaum, Austin, TX (US); Srinivasan Iyer, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 251 days.

(21) Appl. No.: 14/106,442

(22) Filed: Dec. 13, 2013

(65) Prior Publication Data

US 2015/0169289 A1 Jun. 18, 2015

(51) Int. Cl.
G06F 7/487 (2006.01)
G06F 7/544 (2006.01)

(52) U.S. Cl.
CPC ........... *G06F 7/4876* (2013.01); *G06F 7/5443* (2013.01)

(58) Field of Classification Search
CPC ............................ G06F 7/4876; G06F 7/5443
USPC .................................................. 708/501, 503
See application file for complete search history.

(56) References Cited

U.S. PATENT DOCUMENTS

| | | | | |
|---|---|---|---|---|
| 5,983,256 A * | 11/1999 | Peleg | .................... | G06F 7/4812 708/523 |
| 2004/0225705 A1* | 11/2004 | Rumynin | .............. | G06F 7/5336 708/620 |
| 2005/0228844 A1* | 10/2005 | Dhong | .................... | G06F 7/483 708/501 |
| 2009/0150654 A1* | 6/2009 | Oberman | ............ | G06F 9/30014 712/221 |
| 2010/0281235 A1* | 11/2010 | Vorbach | .................. | G06F 7/483 712/15 |
| 2013/0332501 A1* | 12/2013 | Boersma | ................ | G06F 7/483 708/501 |

OTHER PUBLICATIONS

Schwarz et al., "A Radix-8 CMOS S/390 Multiplier", Jul. 6-9, 1997, IEEE Computer Society Press, Proceddings, 13th Symposium on Computer Arithmetic, 3-4.*
Knagge, "Booth Recoding", Jul. 27, 2010, Internet Webpage.*
Huang et al., "A New Architecture for Multiple-Precision Floating-Point Multiply-Add Fused Unit Design", Jun. 25-27 2007, IEEE Computer Society Press, Proceddings, 18th Symposium on Computer Arithmetic, 6-7.*
Wikipedia, Floating Point, Nov. 16, 2012, pp. 1-24.*

* cited by examiner

*Primary Examiner* — Andrew Caldwell
*Assistant Examiner* — Calvin M Brien
(74) *Attorney, Agent, or Firm* — Zilka-Kotab, PC

(57) ABSTRACT

A system and method are provided for performing 32-bit or dual 16-bit floating-point arithmetic operations using logic circuitry. An operating mode that specifies an operating mode for a multiplication operation is received, where the operating mode is one of a 32-bit floating-point mode and a dual 16-bit floating-point mode. Based on the operating mode, nine recoding terms for a mantissa of at least one floating-point input operand are determined. A dual-mode multiplier array circuit that is configurable to generate partial products for either one 32-bit floating-point result or for two 16-bit floating-point results computes the partial products based on the nine recoding terms. The partial products are processed to generate an output based on the operating mode.

20 Claims, 13 Drawing Sheets

LOGIC CIRCUITRY CONFIGURABLE TO PERFORM 32-BIT OR DUAL 16-BIT FLOATING-POINT OPERATIONS

FIELD OF THE INVENTION

The present invention relates to logic circuitry, and more specifically to logic circuitry that can be configured to perform 32-bit or dual 16-bit floating-point operations.

BACKGROUND

Processing units such as central processing units (CPUs) and graphics processing units (GPUs) are designed to perform arithmetic operations that conform to a specified numeric representation. One common numeric representation is a floating-point number, which typically includes a mantissa field, an exponent field, and a sign field. For example, a floating-point number format specified by the Institute of Electrical and Electronics Engineers (IEEE®) is thirty-two bits in size and includes twenty-three mantissa bits, eight exponent bits, and one sign bit. A sixteen bit floating-point format includes ten mantissa bits, five exponent bits, and one sign bit. Floating-point arithmetic circuits configured to implement arithmetic operations on floating-point numbers must properly process one or more input floating-point numbers and generate an arithmetically correct floating-point result.

A floating-point multiply/add unit that is configured to perform thirty-two bit floating-point operations may be used to perform sixteen bit floating-point operations by padding the sixteen bit exponent and mantissa with zeros. However, performing the sixteen bit floating-point operations is not an efficient use of the logic circuits that are designed to perform thirty-two bit floating-point operations. Thus, there is a need for improving the processing efficiency when thirty-two bit floating-point arithmetic logic circuits are used to perform sixteen bit floating-point arithmetic operations and/or addressing other issues associated with the prior art.

SUMMARY

A system and method are provided for performing 32-bit or dual 16-bit floating-point arithmetic operations using logic circuitry. An operating mode that specifies an operating mode for a multiplication operation is received, where the operating mode is one of a 32-bit floating-point mode and a dual 16-bit floating-point mode. Based on the operating mode, nine recoding terms for a mantissa of at least one floating-point input operand are determined. A dual-mode multiplier array circuit that is configurable to generate partial products for either one 32-bit floating-point result or for two 16-bit floating-point results computes the partial products based on the nine recoding terms. The partial products are processed to generate an output based on the operating mode.

DETAILED DESCRIPTION

In accordance with one possible embodiment, logic circuitry may be configured to perform either a single 32-bit floating-point arithmetic operation or dual 16-bit floating-point arithmetic operations. For example, the logic circuitry may be configured to perform a multiply-accumulate operation where three input operands are 32-bit floating-point values, perform two multiply accumulate operations where six input operands are 16-bit floating-point values, or perform one sum-of-products operation where four input operands are 16-bit floating-point values. The same logic circuitry may be used to perform the different operations. In one embodiment, a single multiplier array is configured to generate partial products for either one 32-bit floating-point result or two 16-bit floating-point results.

Figure 1A:
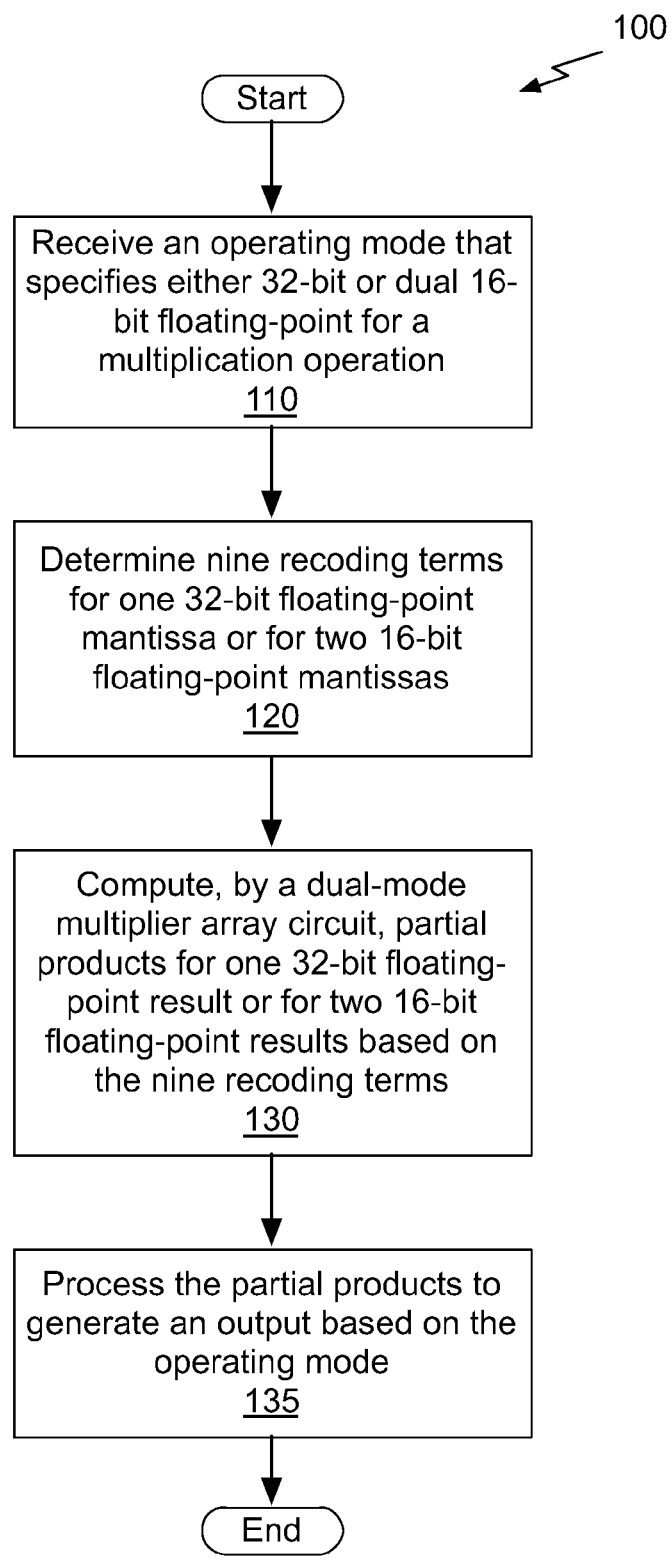
FIG. 1A illustrates a flowchart of a method for performing 32-bit or dual 16-bit floating-point operations using logic circuitry, in accordance with one embodiment.

FIG. 1A illustrates a flowchart of a method 100 for performing 32-bit or dual 16-bit floating-point operations using logic circuitry, in accordance with one embodiment. At operation 110, an operating mode that specifies either a 32-bit floating-point mode or a dual 16-bit floating-point mode for a multiplication operation is received. In one embodiment, the 32-bit and 16-bit floating-point operations are performed on values represented in an IEEE® floating-point format.

At operation 120, nine recoding terms are determined for one 32-bit floating-point mantissa or for two 16-bit floating-point mantissas. In one embodiment, the nine recoding terms are determined using the Booth encoding technique and each recoding term is determined based on four bits of the mantissa.

At operation 130, a dual-mode multiplier array circuit computes partial products for one 32-bit floating-point result or for two 16-bit floating-point results based on the nine recoding terms. At operation 135, the partial products are processed to generate an output based on the operating mode. In one embodiment, the output may be a result of a single 32-bit floating-point multiply-accumulate arithmetic operation, two 16-bit floating-point multiply-accumulate arithmetic operations, or a sum of two 16-bit floating-point multiply operations.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

A floating-point arithmetic processing unit may include logic circuitry that can be configured to perform either 32-bit floating-point operations or dual 16-bit floating-point operations. Using the same logic circuitry in two different operating modes, where lower precision operations are performed in parallel enables greater processing throughput for 16-bit floating-point operations. To enable sharing of the same logic circuitry, the input operands are mapped differently based on the operating mode.

Figure 1B:
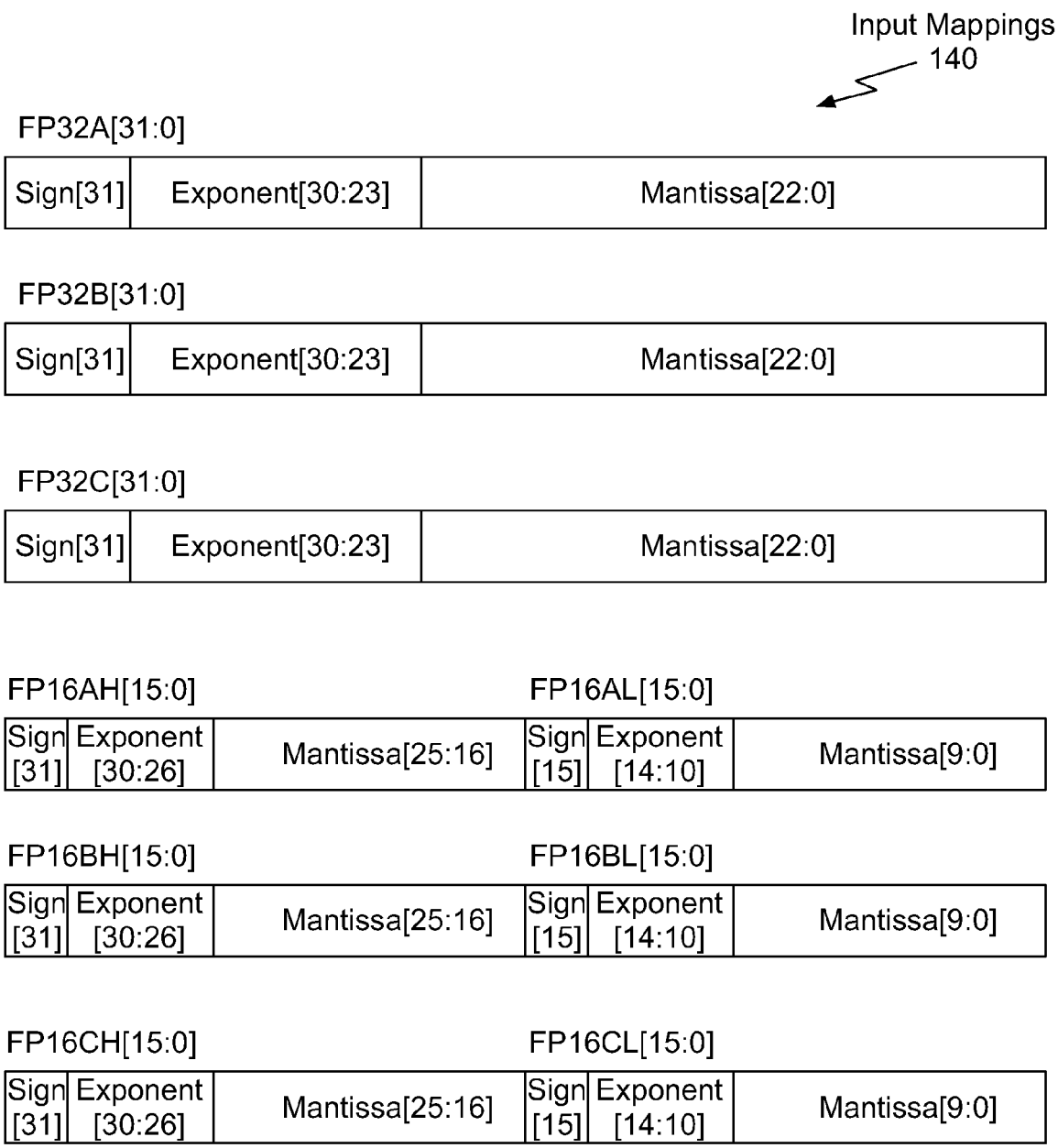
FIG. 1B illustrates mappings for the 32-bit and 16-bit floating-point operands for different operating modes, in accordance with one embodiment.

FIG. 1B illustrates input mappings 140 for the 32-bit and 16-bit floating-point operands for different operating modes, in accordance with one embodiment. In one embodiment, three different operating modes are supported by a floating-point arithmetic processing unit and either two or three 32-bit input operands are received. The input operands are A[31:0], B[31:0], and C[31:0].

A first operating mode performs a 32-bit floating-point multiply-accumulate (MAC) operation using three 32-bit floating-point input operands. The three input operands, A[31:0], B[31:0], and C[31:0], are mapped to FP32A[31:0], FP32B[31:0], and FP32C[31:0], respectively. The output is a 32-bit floating-point value equal to FP32A*FP32B+FP32C. When the first operating mode is specified, each of the three operands is processed as a 32-bit floating-point value. As shown in FIG. 1B, each 32-bit floating-point input operand includes a single sign bit, an 8-bit exponent, and a 24-bit mantissa with an implied leading one.

A second operating mode performs two 16-bit floating-point multiply-accumulate (MAC) operations using six 16-bit floating-point input operands that are encoded in three 32-bit input operands. A first (high) portion of the A input operand, A[31:16] is mapped to FP16AH[15:0] and a second (low) portion of the A input operand, A[15:0] is mapped to FP16AL[15:0]. A first (high) portion of the B input operand, B[31:16] is mapped to FP16BH[15:0] and a second (low) portion of the B input operand, B[15:0] is mapped to FP16BL[15:0]. Similarly, a first (high) portion of the C input operand, C[31:16] is mapped to FP16CH[15:0] and a second (low) portion of the C input operand, C[15:0] is mapped to FP16CL[15:0]. The output is two 16-bit floating-point values equal to FP16AH*FP16BH+FP16CH and FP16AL*FP16BL+FP16CL. When the second operating mode is specified, each of the six 16-bit floating-point input operands is processed as a 16-bit floating-point value. As shown in FIG. 1B, each 16-bit floating-point input operand includes a single sign bit, a 5-bit exponent, and an 10-bit mantissa.

A third operating mode performs a 16-bit floating-point sum of two products (dot-product, DP) operation using four 16-bit floating-point input operands that are encoded in the two 32-bit input operands. The mappings of the A and B inputs are the same as for the second operating mode and the C input operand is not used for the third operating mode. The output is one 16-bit floating-point value equal to FP16AH*FP16BH+FP16AL*FP16BL. When the third operating mode is specified, each of the four 16-bit floating-point input operands is processed as a 16-bit floating-point value.

Conventional IEEE format floating-point multiply/add units include a large multiplier followed by a wide adder which receives a product generated by the multiplier and a shifted version of an addend that are combined to produce the value of FP32A*FP32B+FP32C that is then normalized. This value is then inspected and renormalized to return a value conforming to the IEEE floating-point format specification. To conform to the IEEE standard, an implementation of a floating-point arithmetic processing unit maintains complete internal precision between the multiplier and multiplicand (FP32A and FP32B) used to generate the product and the FP32C addend through the computation to the output. The logic circuitry needed to maintain the internal precision to compute a single 32-bit floating-point MAC operation may be configured to maintain the internal precision needed to compute two 16-bit floating-point MAC operations or one 16-bit floating-point DP operation.

Figure 2A:
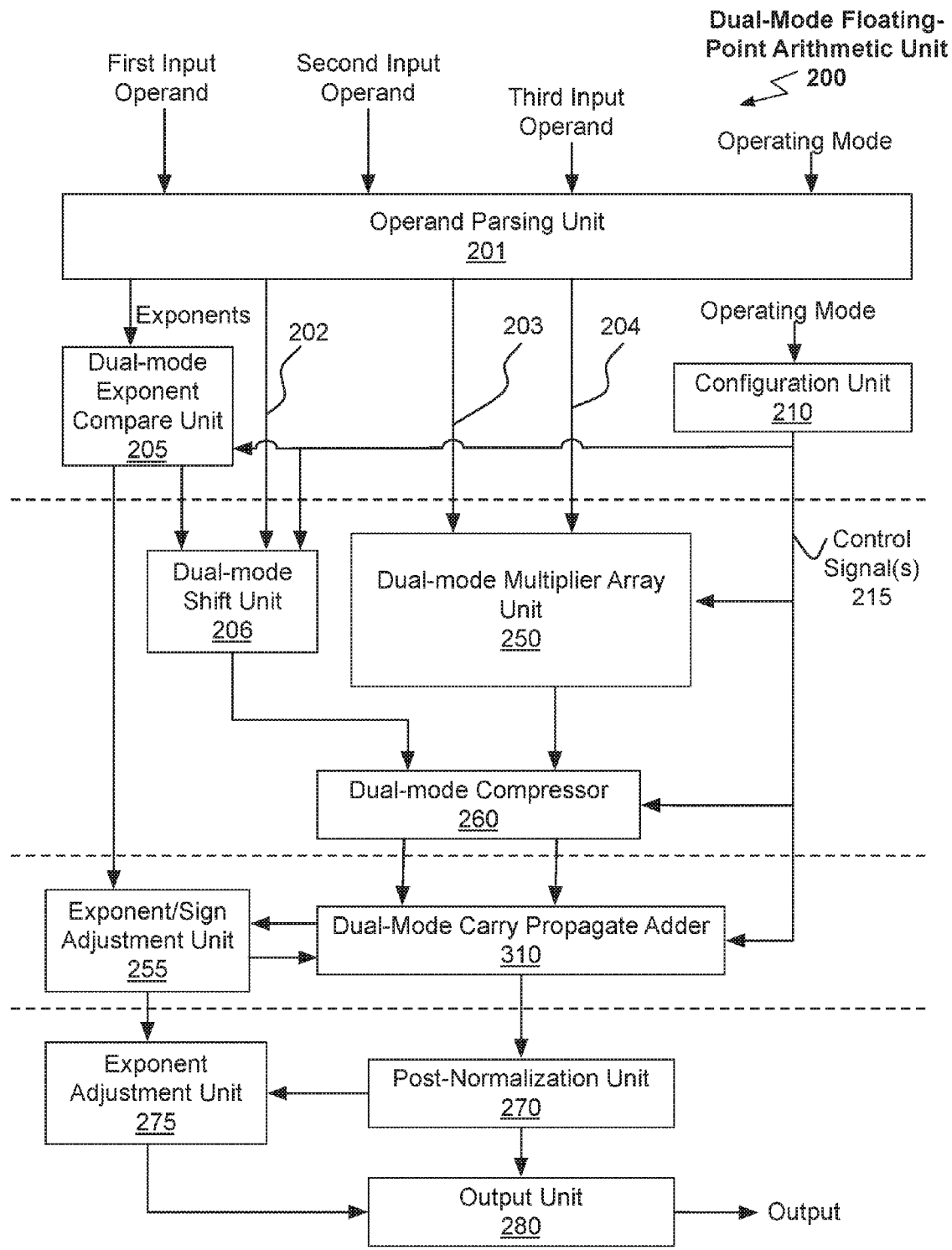
FIG. 2A illustrates a block diagram of a dual-mode floating-point arithmetic unit, in accordance with one embodiment.

FIG. 2A illustrates a block diagram of a dual-mode floating-point arithmetic unit 200, in accordance with one embodiment. The dual-mode floating-point arithmetic unit 200 receives a first, second, and third (optional) input operand and produces an output. In the context of the present embodiment, the two or three input operands are 32-bits and the output is 32-bits representing one or two 16-bit values or one 32-bit value. As shown in FIG. 2A, the dual-mode floating-point arithmetic unit 200 is configured to compute the output according to the operating mode (e.g., 32-bit floating-point MAC, dual 16-bit floating-point MAC, or 16-bit floating-point DP). In other embodiments, the dual-mode floating-point arithmetic unit 200 may be configured to perform other arithmetic operations, such as, addition, subtraction, division, reciprocal, and the like, without limitation.

An operand parsing unit 201 is configured to parse each input operand into one or two exponents, one or more mantissas, and one or two sign bits according to the operating mode by mapping the input operands as described in conjunction with FIG. 1B. The exponents are output to a dual-mode exponent compare unit 205 that generates a difference between the C operand exponent and the sum of the A and B operand exponents for each MAC operation (i.e., two differences for 16-bit floating-point MAC and one difference for 32-bit floating-point MAC). Details of the dual-mode exponent compare unit 205 are provided in conjunction with FIG. 2B. The difference(s) are shift amounts that are provided to a dual-mode shift unit 206. Two shift amounts are computed for the 16-bit floating-point MAC operating mode. The dual-mode shift unit 206 also receives one or two C mantissas 202 (e.g., FP32C mantissa or FP16CH and FP16CL mantissas) from the operand parsing unit 201 when a MAC operating mode is used.

The dual-mode shift unit 206 shifts the C mantissa(s) by the shift amount for the MAC operations and outputs aligned C mantissa(s) to a dual-mode compressor 260. The dual-mode compressor 260 sums the aligned C mantissa(s) into partial products output by the dual-mode multiplier array unit 250.

For a DP operation, the dual-mode exponent compare unit 205 generates a difference between the sum of the FP16AH and FP16BH operand exponents and the sum of the FP16AL and FP16BL operand exponents. For a DP operation, the dual-mode compressor 260 computes the two products of the mantissas by summing the partial products and then the shift amount is used by the dual-mode shift unit 206 or the dual-mode compressor 260 to shift one of the two products of the mantissas before the two products are summed by a dual-mode carry propagate adder 310. In one embodiment, the product of the FP16AL and FP16BL operand mantissas are shifted by the shift amount. The dual-mode compressor 260 that is configured to perform DP operations is described in detail in conjunction with FIG. 3B.

The mantissas output by the operand parsing unit 201 are input to the dual-mode multiplier array unit 250. One or two mantissas 203 are multiplier(s) and one or two mantissas 204 are multiplicand(s). The one or two mantissas 203 are the FP32A mantissa when the operating mode is 32-bit floating-point or the FP16AH and FP16AL mantissas when the operating mode is 16-bit floating-point. The one or two mantissas 204 are the FP32B mantissa when the operating mode is 32-bit floating-point or the FP16BH and FP16BL mantissas when the operating mode is 16-bit floating-point.

The dual-mode multiplier array unit 250 computes partial products for either one 32-bit result or for two 16-bit results. Details of the dual-mode multiplier array unit 250 are provided in conjunction with FIGS. 2C, 2D, and 2E. The partial products are summed by the dual-mode compressor 260 to compute a set of sum and carry values for either one 32-bit result or for two 16-bit results. The dual-mode carry-propagate adder 310 adds the sum and carry values to produce one 76-bit un-normalized product of mantissas corresponding to a 32-bit floating-point output, two 37-bit un-normalized products of mantissas corresponding to two 16-bit floating-point outputs, or one 37-bit sum of two products of mantissas corresponding to a 16-bit floating-point output. Details of the dual-mode compressor 260 and the dual-mode carry-propagate adder 310 are provided in conjunction with FIGS. 3A and 3B.

A configuration unit 210 receives the operating mode and generates control signal(s) 215 that are used to configure the various units within the dual-mode floating-point arithmetic unit 200 differently to perform 32-bit floating-point operations or 16-bit floating-point operations and/or to perform MAC or DP operations. The operating mode may be provided by configuration registers related to operating mode settings and/or upstream logic circuitry. The exponent/sign adjustment unit 255 is configured to perform one's complement to two's complement conversion and determine the final sign for the output.

The output of the dual-mode carry propagate adder 310 is processed by a post-normalization unit 270 to produce one or two mantissas of the output. For example, the post-normalization unit 270 may be configured to identify a leading one in the result and provide a shifted mantissa without the leading one to an output unit 280. The number of bits of the result to the left of the leading one may be provided to an exponent adjustment unit 275. The dual-mode exponent compare unit 205 provides a sum of the operand exponents or the C operand's exponent, depending on the relative magnitude of the exponents and the operating mode, to the exponent adjustment unit 275. The exponent adjustment unit 275 computes and provides the exponent(s) of the output to the output unit 280. The output unit 280 may be a register that receives the exponent(s) and shifted mantissa(s) and stores the output.

The dotted lines in FIG. 2A indicate where one or more pipeline stages of registers may be inserted to pipeline the datapath. Persons skilled in the art will understand that fewer or additional pipeline registers may be implemented within the dual-mode floating-point arithmetic unit 200.

Figure 2B:
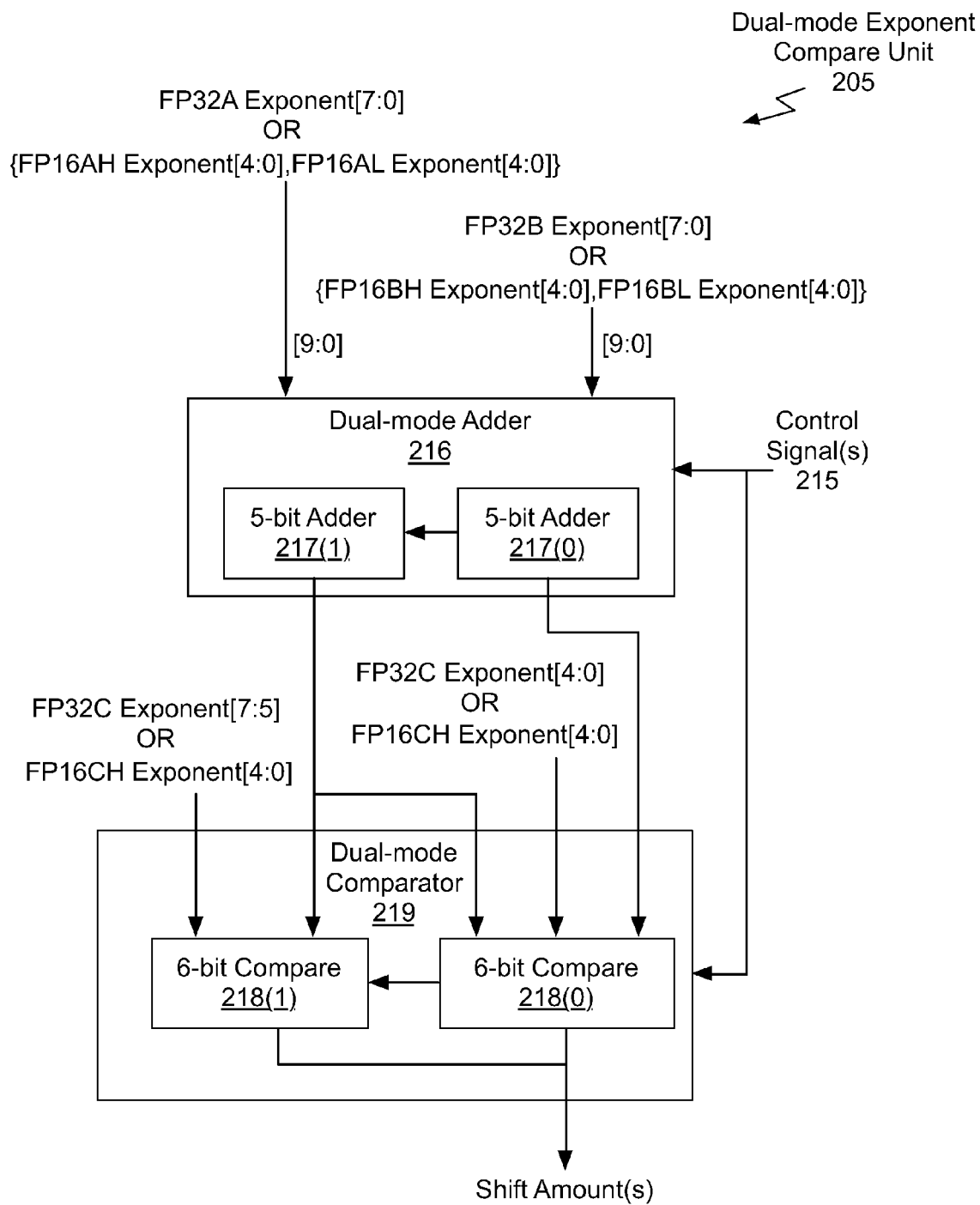
FIG. 2B illustrates a dual-mode exponent compare unit shown in FIG. 2A, in accordance with one embodiment.

FIG. 2B illustrates the dual-mode exponent compare unit 205 shown in FIG. 2A, in accordance with one embodiment. The 8-bit exponents for 32-bit floating-point input operands, FP32A Exponent and FP32B Exponent, each have two zeros appended to sign-extend the values and form 10-bit inputs to the dual-mode adder 216. The dual-mode adder 216 includes two 5-bit adders 217 that can be configured as a single 10-bit adder based on the control signal(s) 215. Specifically, the carry-out generated by the 5-bit adder 217(0) is provided as an input to the 5-bit adder 217(1) to form a single 10-bit adder. When the operating mode performs 32-bit floating-point operations, the dual-mode adder 216 is configured to compute a 9-bit sum and carry-bit (that will be zero) and when the operating mode performs 16-bit floating-point operations, the dual-mode adder 216 is configured to compute two 6-bit sums, each with a carry-bit. The sums are output to a dual-mode comparator 219 that may be configured to perform two 6-bit compares or one 9-bit compare based on the control signal(s) 215. Specifically, the carry-out generated by the 6-bit compare 218(0) is provided as an input to the 6-bit compare 218(1) to form a single 12-bit comparator. The dual-mode comparator 219 outputs one or two differences as the shift amount(s) by performing a subtraction operation.

When the operating mode performs two 16-bit floating-point MAD operations, the sums computed by the 5-bit adders 217(1) and 217(0) are provided as inputs to the 6-bit compares 218(1) and 218(0), respectively. The 6-bit compares 218(1) and 218(0) also receive the 5-bit C exponents. When the operating mode performs the 16-bit floating-point DP operation, the sums computed by the 5-bit adders 217(1) and 217(0) are both provided as inputs to the 6-bit compares 218(0) and the 5-bit C exponent is ignored. The 6-bit compare 218(1) may be disabled for a DP operation.

Figure 2C:
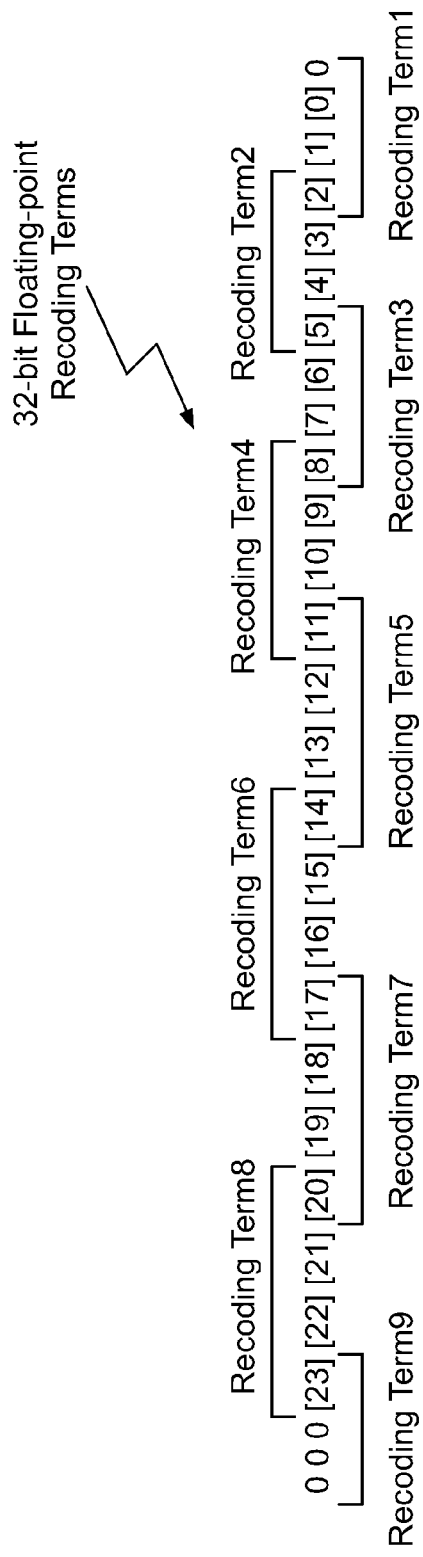
FIG. 2C illustrates nine recoding terms for a 32-bit multiplier floating-point multiplier, in accordance with one embodiment.

FIG. 2C illustrates nine recoding terms for a 32-bit floating-point multiplier, in accordance with one embodiment. The recoding terms are generated using a radix 8 Booth's Encoding technique that is well understood by those skilled in the art. In other embodiments different variations of Booth's encoding may be implemented, such as radix 4 Booth's encoding. In general, a multiplier mantissa (A) and a multiplicand mantissa (B) are received to compute a product mantissa. The multiplier mantissa is recoded into recoding terms. The recoding terms are applied to the multiplicand mantissa to produce partial products. The partial products are then summed to compute the product mantissa. Conceptually, the recoding terms are a set of coefficients that are used to scale the multiplicand and generate a set of scaled multiplicands.

Four bits including one or more bits of the multiplier mantissa (A) are used to generate each recoding term. A is FP32A mantissa[22:0] with the leading one appended to the most-significant bit to produce A[23:0]. To determine the Booth's recoded terms the least-significant bit of the multiplier mantissa is padded with a zero and the most-significant bit is padded with three zeros. A recoding term1 is determined based on bits A[2:0] and the padded zero. The recoding term2 is determined based on A[5:2]. The recoding term3 is determined based on A[8:5]. The recoding term4 is determined based on A[11:8]. The recoding terms is determined based on A[14:11]. The recoding term6 is determined based on A[17:14]. The recoding term7 is determined based on A[20:17]. The recoding term8 is determined based on A[23:20]. The recoding term9 is determined based on the three padded zeros and A[23].

TABLE 1 illustrates the partial product that is determined (second column) for each of the possible values of a recoding term (first column). The recoding terms specify different variations of the multiplicand as 0, +1B, +2B, +3B, +4B, −4B, −3B, −2B, and −1B, where B is the multiplicand. The nine recoding terms may be represented as the four bits (as shown in TABLE 1) or the recoding terms may otherwise encode the variation of the multiplicand to produce a portion of partial products. When the operating mode performs 32-bit floating-point operations, the multiplicand mantissa, B, is FP32B mantissa[22:0] with the leading one appended to the most-significant bit to produce B[23:0].

TABLE 1

| Radix 8 Booth recoding | |
|---|---|
| 0000, 1111 | 0 |
| 0001, 0010 | +1B |
| 0011, 0100 | +2B |
| 0101, 0110 | +3B |
| 0111 | +4B |
| 1000 | −4B |
| 1001, 1010 | −3B |
| 1011, 1100 | −2B |
| 1101, 1110 | −1B |

The variations of the multiplicand mantissa corresponding to the nine recoded terms are partial products that may be summed to compute the product A*B=FP32A*FP32B. Each of the partial products may be left-shifted by two or three bit positions (depending on the radix used for the recoded terms) relative to previous partial products before being summed. Booth's recoding reduces the number of partial products that are summed to compute a product, resulting in a more efficient implementation of a multiplier.

Figure 2D:
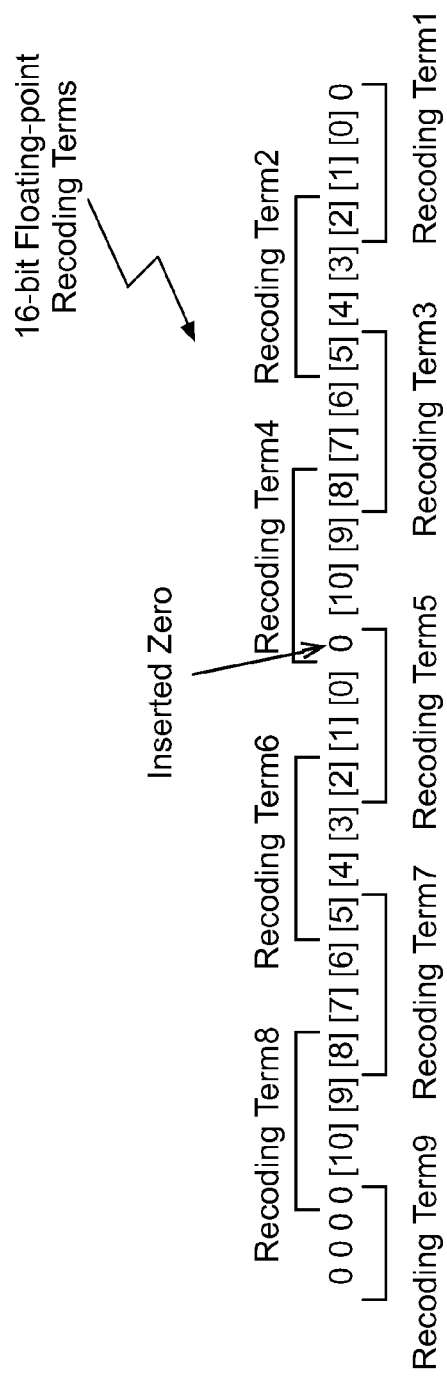
FIG. 2D illustrates nine recoding terms for two 16-bit floating-point multipliers, in accordance with one embodiment.

FIG. 2D illustrates nine recoding terms for two 16-bit floating-point multipliers, in accordance with one embodiment. The recoding terms for two 16-bit floating-point multipliers are also generated using a radix 8 Booth's Encoding technique that is well understood by those skilled in the art. The two 16-bit floating-point mantissas are formatted to use the same recoding circuitry as is used for the 32-bit floating-point mantissa recoding.

The multiplier mantissa, A, includes the FP16AH mantissa[9:0] in the most-significant bits and the FP16AL mantissa[9:0] in the least-significant bits, each with the leading one appended to the most-significant bit to produce two 11-bit mantissas, for a total of 22 bits. A zero is inserted between the two mantissas to produce 23 bits of A. To determine the Booth's recoding terms the least-significant bit of the multiplier mantissa is padded with a zero and the most-significant bit is padded with three zeros, as shown in FIG. 2D.

The multiplier mantissa bits are mapped as follows: A[23] is zero, A[22:12] is the FP16AH mantissa[10:0], A[11] is the inserted zero, and A[10:0] is the FP16AL mantissa[10:0]. The nine recoding terms are determined based on bits of A[22:0] and the padded zeros, as previously described in conjunction with FIG. 2C. However, the recoding term9 is zero for the 16-bit floating-point mantissa because A[23] and the padding bits are all zeros. Importantly, the variations of a first multiplicand mantissa corresponding to the recoding term1, recoding term2, recoding term3, and recoding term4 are the partial products that may be summed to compute the product FP16AH*FP16BH and the variations of a second multiplicand mantissa corresponding to the recoding terms, recoding term6, recoding term7, and recoding term8 are the partial products that may be summed to compute the product FP16AL*FP16BL.

Figure 2E:
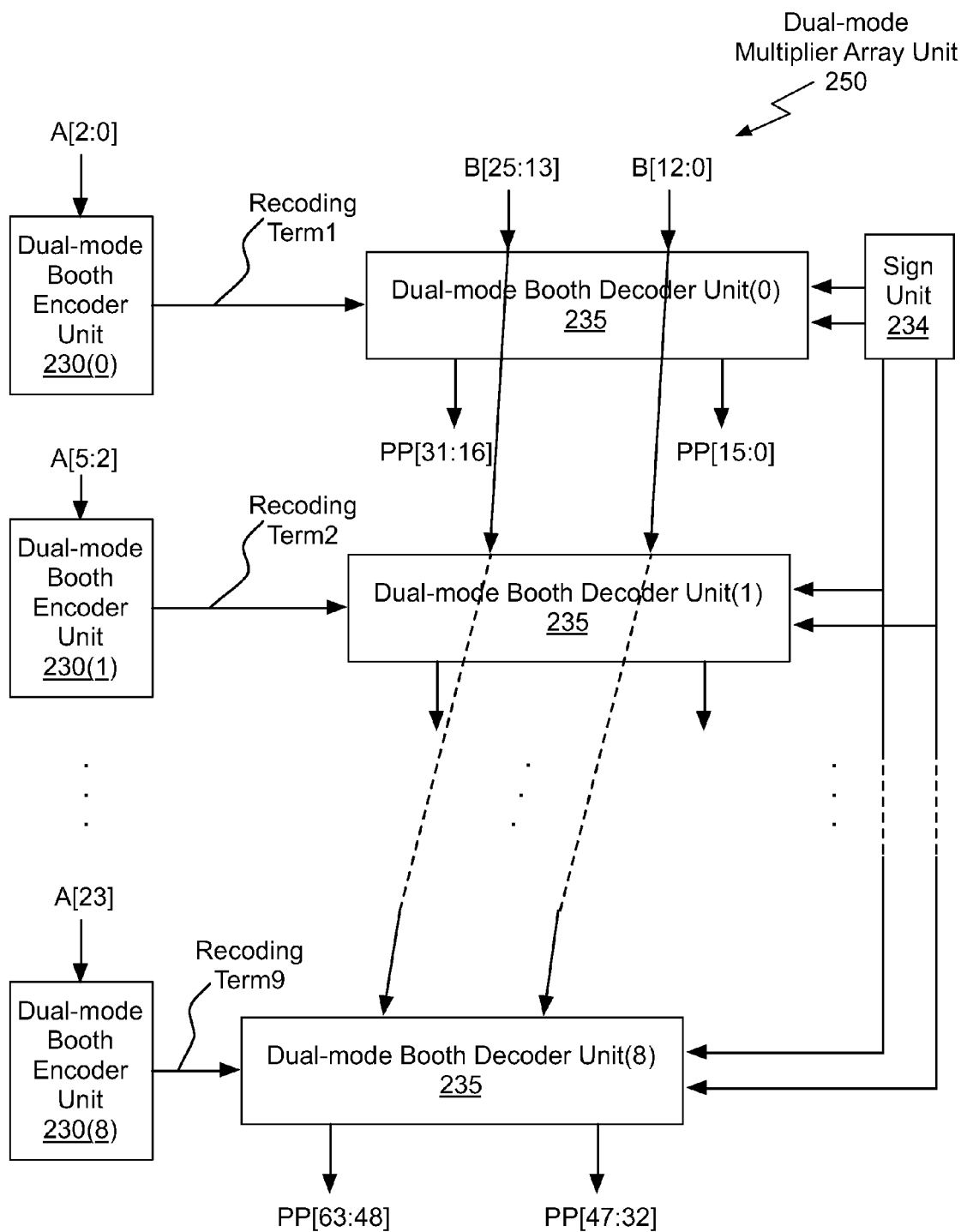
FIG. 2E illustrates a block diagram of the dual-mode multiplier array unit shown in FIG. 2A, in accordance with one embodiment.

FIG. 2E illustrates a block diagram of the dual-mode multiplier array unit 250 shown in FIG. 2A, in accordance with one embodiment. The multiplier mantissa B represents either one 32-bit floating-point format mantissa or two 16-bit floating-point format mantissas based on the operating mode. When the operating mode performs 32-bit floating-point operations B[22:0] is FP32B[22:0] with the implied leading one inserted as B[23] and two padding bits of zero as B[25:24].

When the operating mode performs 16-bit floating-point operations the mantissas for FP16BH and FP16BL are packed into B. Specifically, B[9:0] is FP16BL[9:0] with the implied leading one inserted as B[10] and two padding bits of zero as B[12:11] and B[22:13] is FP16BH[9:0] with the implied leading one inserted as B[23] and two padding bits of zero as B[25:24].

The dual-mode booth encoder units 230 are configured to generate the nine recoding terms. Dual-mode booth decoders units 235 are configured to output the variation of the multiplicand mantissa(s) according to the corresponding recoding term and output the variation as a portion of the partial products. The +/−2B and +/−4B variations of the multiplicand mantissa(s) (shown in the second column of TABLE 1) may be computed by left-shifting the multiplicand mantissa within the dual-mode booth decoder units 235. The negative variations of the multiplicand mantissa(s) may be computed by the dual-mode booth decoder units 235 by performing a two's complement conversion on the corresponding positive variation of the multiplicand mantissa (s). In one embodiment, the +/−3B variation of the multiplicand mantissa(s) is computed by another unit (not shown) and provided to the dual-mode booth decoder units 235. The two padding bits in B[12:11] ensure that there is no overflow of carry-bits between the two mantissas for the 16-bit floating-point operations when 3B is computed.

The mantissas A and B are represented as positive values, so a sign unit 234 is configured to determine a sign of the product resulting from the multiplication. When the operating mode performs a 32-bit floating-point multiplication, the sign is computed as the XOR of the signs of A and B. The computed sign is used to perform a two's complement conversion on the partial products that are output by the dual-mode booth decoder units 235. When the operating mode performs 16-bit floating-point multiplications, the signs are computed as the XOR of the signs corresponding to the two mantissas within each of A and B. The two computed signs are provided to the dual-mode booth decoder units 235 so that the partial products corresponding to each of the two products can be correctly computed. The control signal(s) 215 (not shown) are provided to the dual-mode booth encoder units 230, the dual-mode booth decoder units 235, and the sign unit 234.

When the dual-mode multiplier array unit 250 is configured to perform 32-bit floating-point multiplication, the entire circuit is needed. However, when the dual-mode multiplier array unit 250 is configured to perform 16-bit floating-point multiplication, the dual-mode multiplier array unit 250 is effectively separated into four quadrants, two of which are used to perform the 16-bit floating-point multiplication operations. The first four dual-mode booth encoder units 230(0)-(3) are used to compute the mantissa for FP16AL*FP16BL and the second four dual-mode booth encoder units 230(4)-(7) are used to compute the mantissa for FP16AH*FP16BH. The lower half of each of the dual-mode booth decoder units 235(0)-(3) are used to compute the mantissa for FP16AL*FP16BL and the upper half of each of the dual-mode booth decoder units 235(4)-(7) are used to compute the mantissa for FP16AH*FP16BH. The logic circuitry within the dual-mode multiplier array unit 250 that is not used when the dual-mode multiplier array unit 250 is configured to perform 16-bit floating-point multiplication may be disabled to reduce power consumption.

Figure 2F:
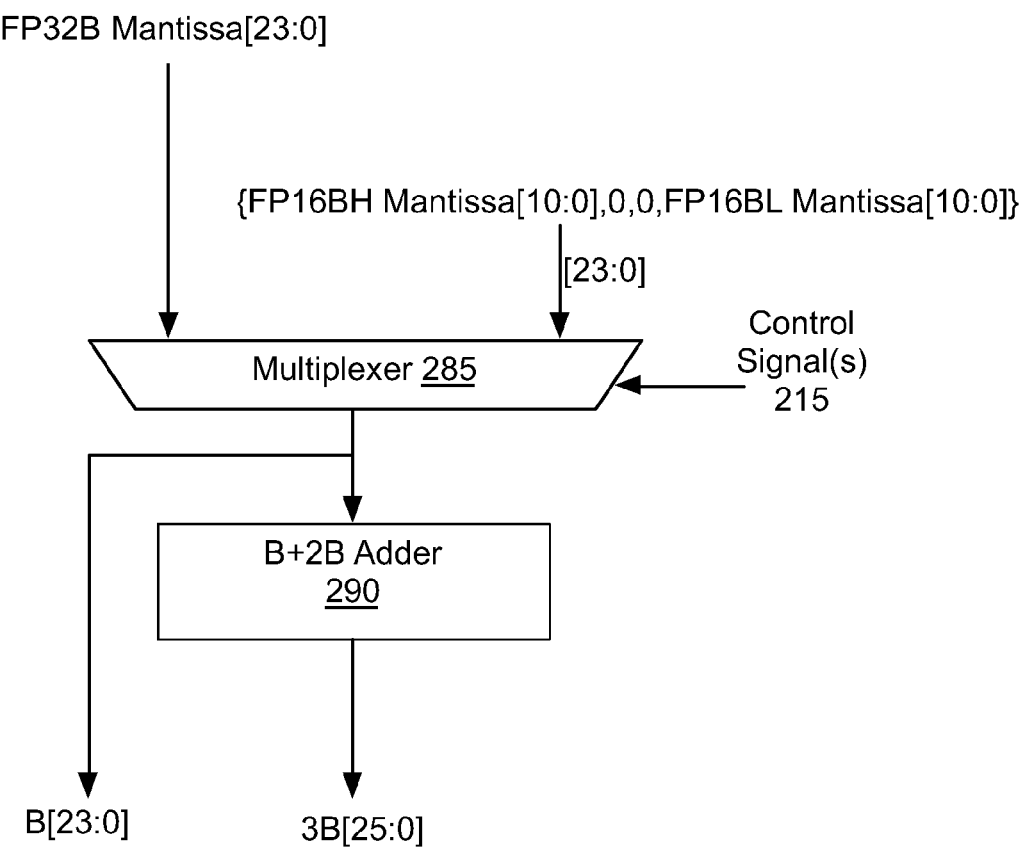
FIG. 2F illustrates a block diagram of logic circuitry that maybe used to compute a variation of the multiplicand according to a recoding term, in accordance with one embodiment.

FIG. 2F illustrates a block diagram of logic circuitry that may be used to compute a variation of the multiplicand according to a recoding term, in accordance with one embodiment. As previously explained, the two mantissas for the 16-bit floating-point multiplicands are packed together to create a 24-bit B mantissa. A multiplexer 285 is configured according to the control signal(s) 215 to select either the FP32B Mantissa or the packed mantissas for output to a B+2B adder 290. The B+2B adder sums the input (i.e., B) with a left-shifted version (i.e., 2B) of the input to generate the 3B variations of the multiplicand mantissa(s). Two packed variations (the BH variations of B and 3B, FP16BH [9:0] and FP16BH[11:0] and the BL variations of B and 3B, FP16BL[9:0] and FP16BL[11:0]) are present in the output B[23:0] and 3B[25:0] when the operating mode performs 16-bit floating-point multiplication. The logic circuitry in the B+2B adder 290 is used to perform both 32-bit and 16-bit floating-point multiplication.

Figure 3A:
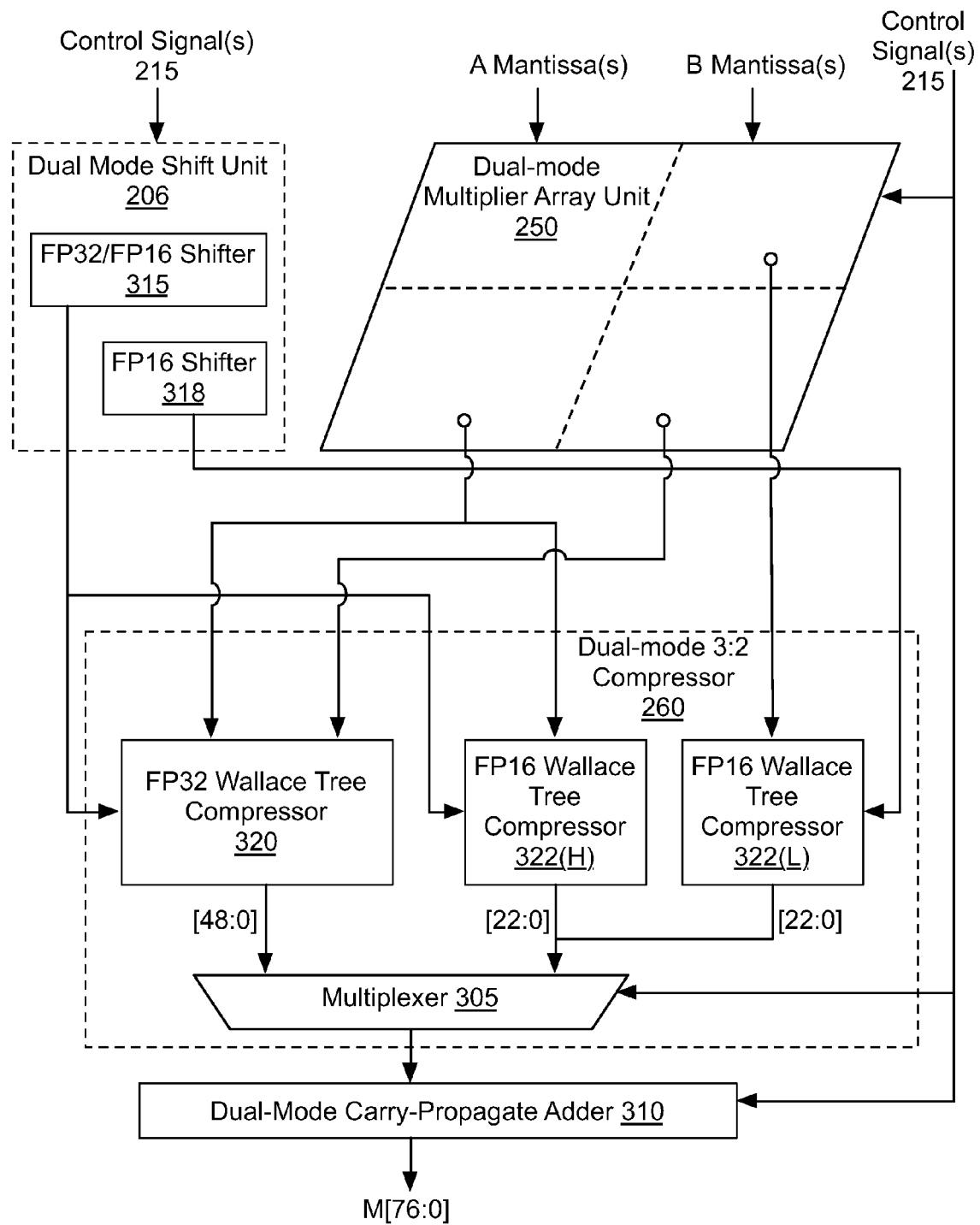
FIG. 3A illustrates a block diagram of a portion of the dual-mode floating-point arithmetic unit shown in FIG. 2A, in accordance with one embodiment.

FIG. 3A illustrates a block diagram of a portion of the dual-mode floating-point arithmetic unit 200 shown in FIG. 2A, in accordance with one embodiment. The logic circuitry shown in FIG. 3A may be configured to perform either two 16-bit floating-point MAC operations or one 32-bit floating-point MAC operation. The different portions (e.g., quarters) of the dual-mode multiplier array unit 250 are indicated by the dashed lines.

When the logic circuitry shown in FIG. 3A is configured to perform two 16-bit floating-point MAC operations, the upper right quarter of the dual-mode multiplier array unit 250 computes the partial products that are provided to a FP16 Wallace tree compressor 322(L) to compute sum and carry values for FP16AL*FP16BL+FP16CL. The Wallace tree compression techniques are well-known to those skilled in the art and are used to efficiently sum partial products to generate a set of sum and carry values. The FP16CL mantissa is shifted by a FP16 shifter 318 to align the FP16CL mantissa to the partial products for FP16AL*FP16BL.

When the logic circuitry shown in FIG. 3A is configured to perform two 16-bit floating-point MAC operations, the lower left quarter of the dual-mode multiplier array unit 250 computes the partial products that are provided to a FP16 Wallace tree compressor 322(H) to compute sum and carry values for FP16AH*FP16BH+FP16CH. The FP16CH mantissa is shifted by a FP32/FP16 shifter 315 to align the FP16CH mantissa to the partial products for FP16AH*FP16BH.

When the logic circuitry shown in FIG. 3A is configured to perform one 32-bit floating-point MAC operation, the entire dual-mode multiplier array unit 250 is used to generate the partial products that are provided to a FP32 Wallace tree compressor 320 to compute sum and carry values for FP32A*FP32B+FP32C. The FP32C mantissa is shifted by the FP32/FP16 shifter 315 to align the FP32C mantissa to the partial products for FP32A*FP32B.

A multiplexer 305 is configured by the control signal(s) 215 to select the carry and sum values output by the FP32 Wallace tree compressor 320 when the operating mode performs 32-bit floating-point operations. The multiplexer 305 is configured by the control signal(s) 215 to select the carry and sum values output by the FP16 Wallace tree compressors 322 when the operating mode performs 16-bit floating-point operations. The selected sum and carry values are summed by a dual-mode carry-propagate adder 310 to generate a result M[76:0]. A carry path in the dual-mode carry-propagate adder 310 is decoupled after the most-significant bit of the mantissa for FP16AL*FP16BL+FP16CL when the operating mode performs 16-bit floating-point operations, so that two separate mantissas are represented by the result M[76:0]. Specifically, M[37:0] corresponds to FP16AL*FP16BL+FP16CL and M[76:39] corresponds to FP16AH*FP16BH+FP16CH. Therefore, the logic circuitry within the dual-mode carry-propagate adder 310 is used during both the 16-bit and the 32-bit floating-point operating modes. Bits M[38:37] are set to zero, as described in conjunction with FIG. 3D.

Figure 3B:
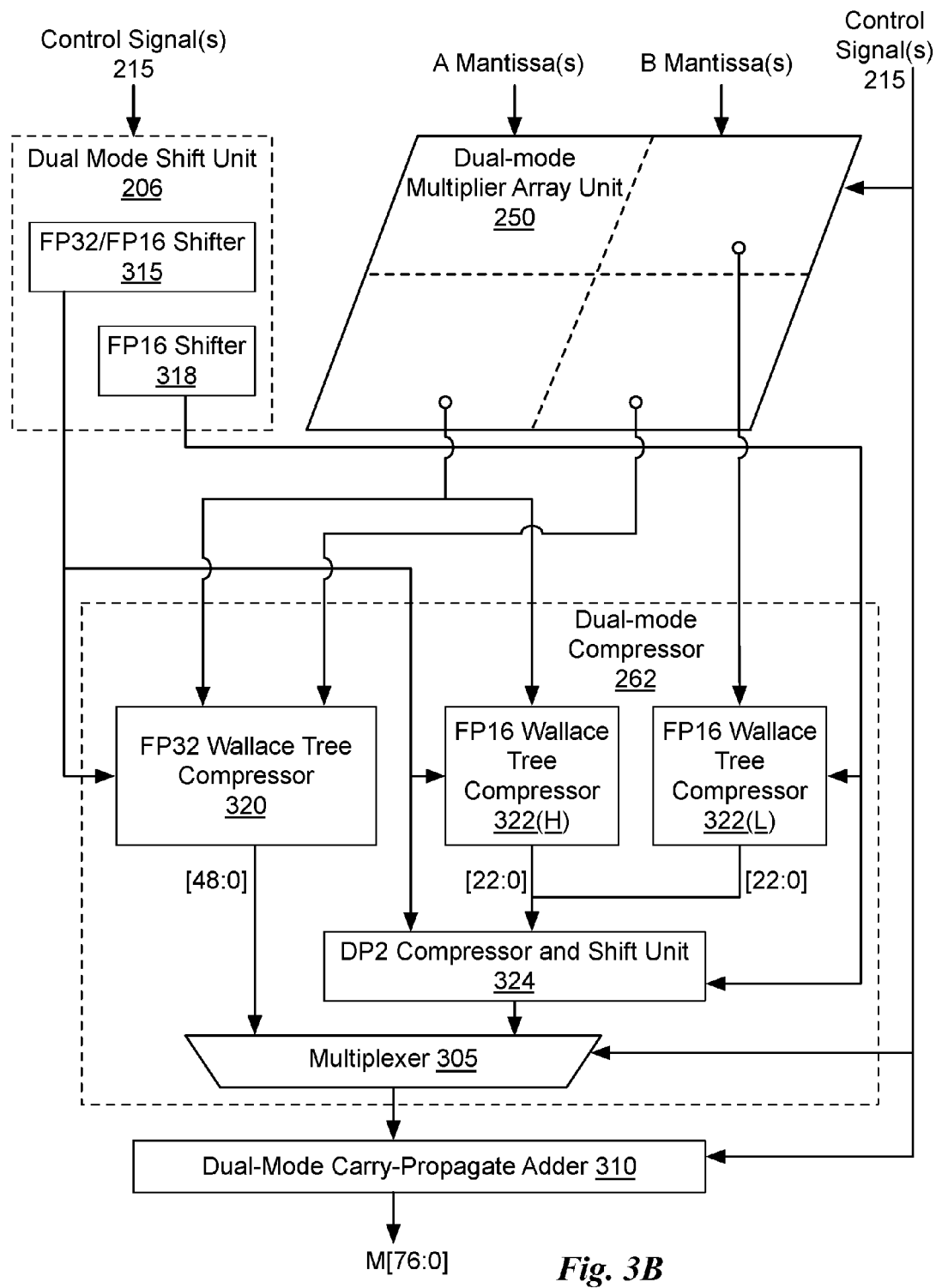
FIG. 3B illustrates a block diagram of another dual-mode floating-point arithmetic unit shown in FIG. 2A, in accordance with one embodiment.

FIG. 3B illustrates a block diagram of another dual-mode floating-point arithmetic unit 200 shown in FIG. 2A, in accordance with one embodiment. The logic circuitry shown in FIG. 3B may be configured to perform at one 16-bit floating-point DP operation, two 16-bit floating-point MAC operations, or one 32-bit floating-point MAC operation. The MAC operations are performed as previously described in conjunction with FIG. 3A. The dual-mode compressor 260 is replaced with a dual-mode compressor 262 that is configured to perform at least the functions of the dual-mode compressor 260.

When the logic circuitry shown in FIG. 3A is configured to perform a 16-bit floating-point DP operation, the upper right quarter of the dual-mode multiplier array unit 250 computes the partial products that are provided to the FP16 Wallace tree compressor 322(L) to compute sum and carry values for FP16AL*FP16BL. The lower left quarter of the dual-mode multiplier array unit 250 computes the partial products that are provided to the FP16 Wallace tree compressor 322(H) to compute sum and carry values for FP16AH*FP16BH. The sum and carry values for either FP16AL*FP16BL or FP16AH*FP16BH are shifted by a DP2 compressor and shift unit 324 to align the sum and carry values before the sum of the two products is computed by the dual-mode carry propagate adder 310. In one embodiment, a FP16 shifter 318 is included within the DP2 compressor and shift unit 324 or the existing FP16 shifter 318 is used to perform the shift for the DP2 operation. The DP2 compressor and shift unit 324 is configured to pass the inputs through to the multiplexer 305 unchanged when the operating mode performs the 16-bit floating-point MAC operation.

The multiplexer 305 is configured by the control signal(s) 215 to select the carry and sum values output by the DP2 compressor and shift unit 324 when the operating mode performs the 16-bit floating-point DP2 operation. The selected sum and carry values are summed by the dual-mode carry-propagate adder 310 to generate a result M[36:0]. The result M[36:0] represents FP16AH*FP16BH+FP16AL*FP16BL when the operating mode performs the 16-bit floating-point DP operation.

Figure 3C:
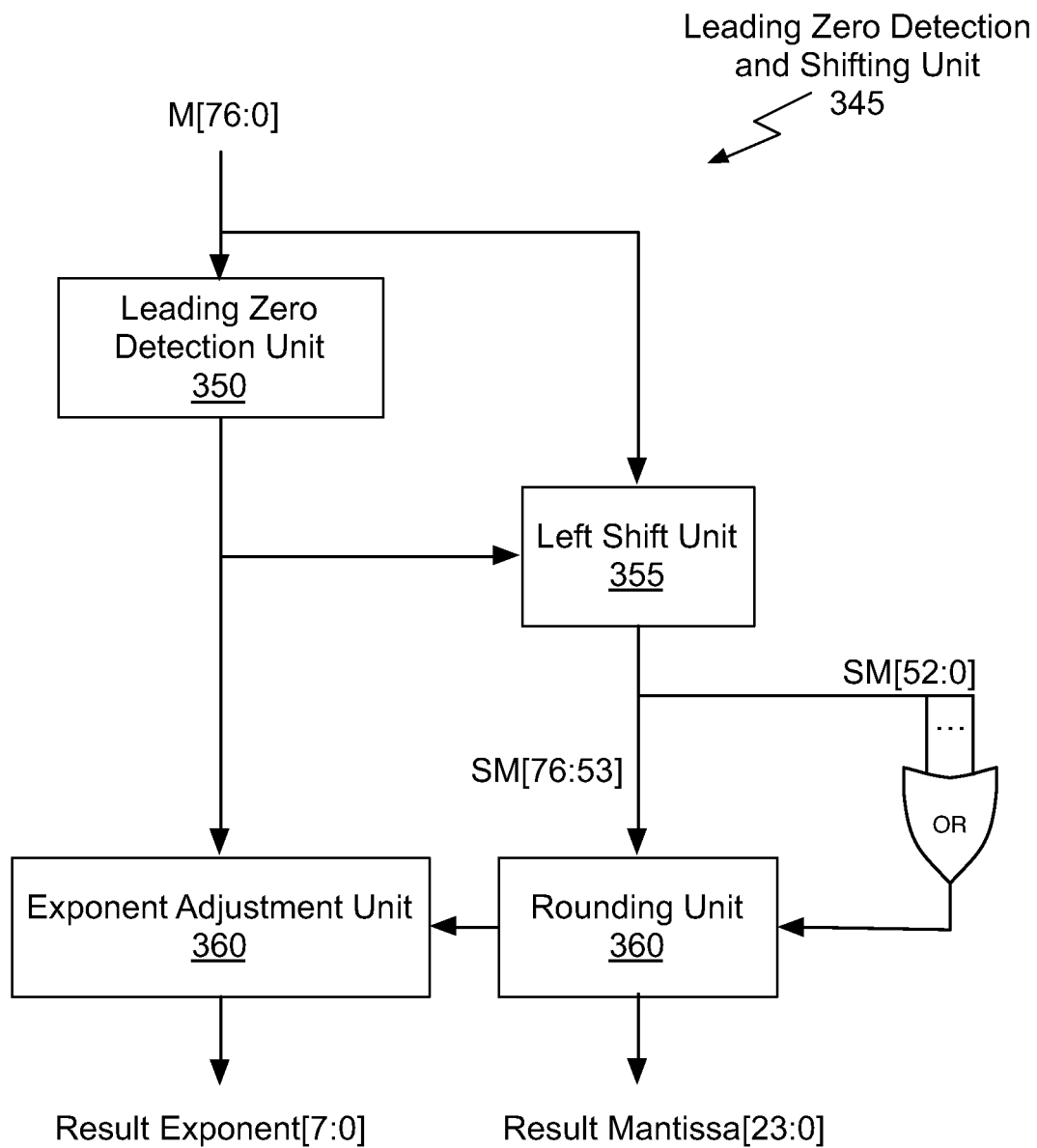
FIG. 3C illustrates a prior art block diagram of a leading zero detection and shifting unit.

FIG. 3C illustrates a prior art block diagram of a leading zero detection and shifting unit 345. The output of the dual-mode carry-propagate adder 310 may have one or more leading zeros that should be removed to normalize the mantissa(s) of the result (the first leading one will also be removed). In a conventional implementation, the pre-normalized result for a 32-bit floating-point operation is 76 bits wide, M[75:0]. A leading zero detection unit 350 identifies any leading zeros and a left shift unit 355 left shifts the result to remove the leading zeros and produce a shifted result SM[75:0]. The lower 53 bits of SM are logically ORed to generate a rounding input that is conditionally summed with SM[75:53] by a rounding unit 360 to generate a result mantissa that is 24-bits. The conditional summing depends on a rounding mode. The exponent is adjusted by an exponent adjustment unit 360 based on the amount by which the un-normalized mantissa is shifted and if the rounding causes an overflow. The exponent adjustment unit 360 generates an 8-bit result exponent.

Figure 3D:
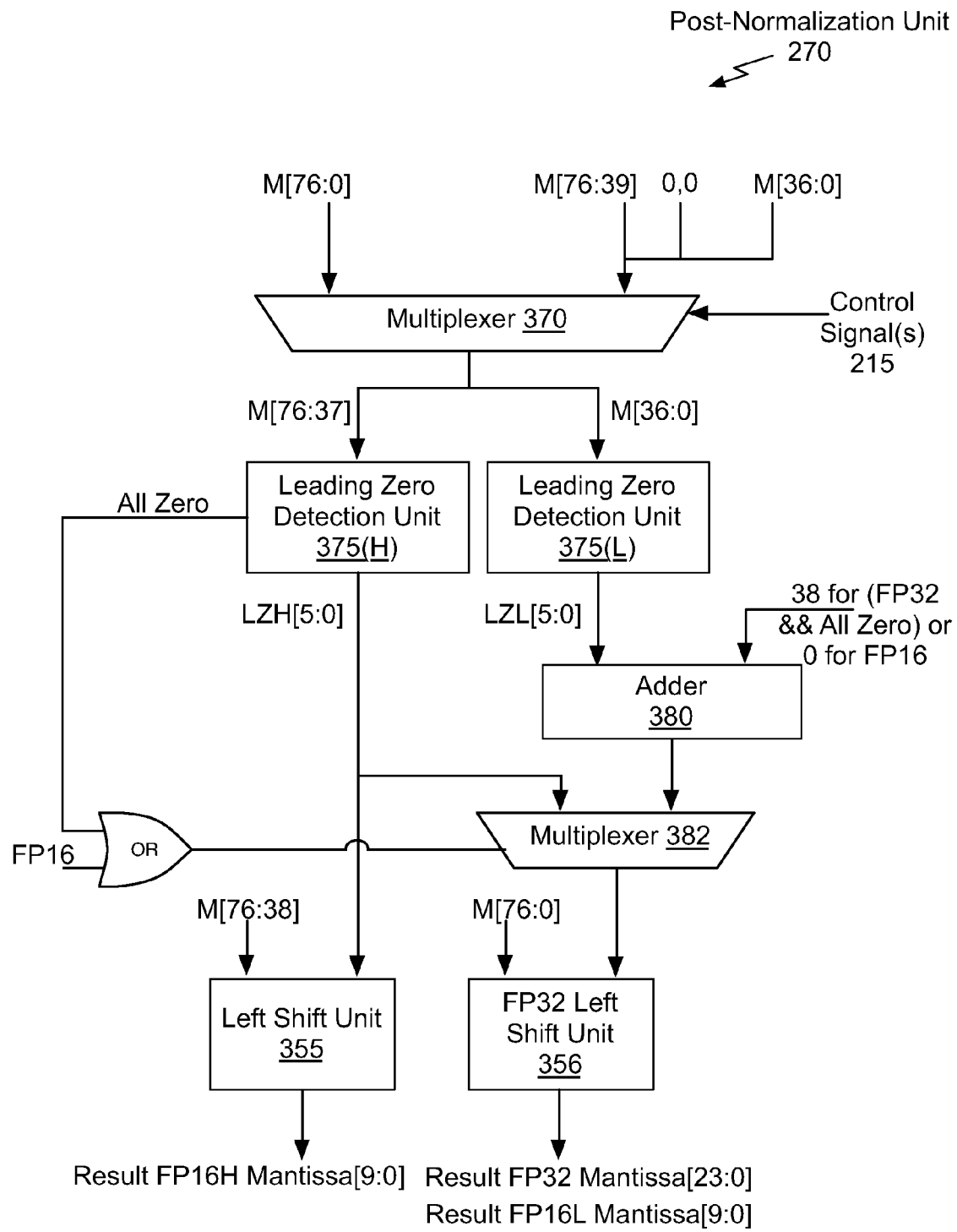
FIG. 3D illustrates a block diagram of a leading zero detection and shifting unit shown in FIG. 3A, in accordance with one embodiment.

FIG. 3D illustrates a block diagram of a post-normalization unit 270 shown in FIG. 3A, in accordance with one embodiment. The post-normalization unit 270 receives the result from the dual-mode carry-propagate adder 310 that represents un-normalized mantissa(s) M[75:0]. A multiplexer 370 is configured based on the control signal(s) to select M[75:0] when the operating mode performs 32-bit floating-point operations and M[75:39],0,0,M[36:0] when the operating mode performs 16-bit floating-point operations.

A leading zero detection unit 375(H) identifies any leading zeros for M[75:37] and when all of the bits of M[75:37] are zeros, the leading zero detection unit 375(H) asserts a signal "all zero". When the signal "all zero" is negated, the leading zero detection unit 375(L) may be disabled during the 32-bit operating mode, because it does not matter if any of the bits in M[36:0] are zero. The leading zero detection unit 375(H) computes a count of the number of leading zeros, LZH[5:0] for M[75:37] and the leading zero detection unit 375(L) computes a count of the number of leading zeros for M[36:0], LZL[5:0].

An adder 380 is configured to sum LZL[5:0] with 38 when "all zero" is asserted and the operating mode performs 32-bit operations. Otherwise, the adder 380 passes LZL[5:0] through to a multiplexer 382 by summing LZL[5:0] with zero. The FP32 left shift unit 356 is configured to shift an un-normalized mantissa for a 32-bit floating-point operation. Therefore, when the operating mode performs a 32-bit operation and the "all zero" signal is asserted or when the operating mode performs a 16-bit operation, the multiplexer 382 selects the output of the adder 380 to be applied to M[75:0] by the FP32 left shift unit 356 and produces a normalized mantissa for the 16-bit or 32-bit floating-point operation, Result FP16L Mantissa[9:0] or Result FP32 Mantissa[23:0], respectively. When the operating mode performs a 32-bit operation and the "all zero" signal is negated, the multiplexer 382 selects the output of the leading zero detection unit 375(H) to be applied to M[75:0] by the FP32 left shift unit 356 to produce a normalized mantissa for the 32-bit floating-point operation, Result FP32 Mantissa[23:0].

A left shift unit 355 is configured to shift an un-normalized mantissa for a 16-bit floating-point operation. The left shift unit 355 receives LZH[5:0] and applies LZH[5:0] to M[75:38] to produce a normalized mantissa for a 16-bit floating-point MAC operation, Result FP16H Mantissa[9:0]. Most of the logic circuitry in the post-normalization unit 270 is used for both the 16-bit and the 32-bit floating-point operations.

When the operating mode is 16-bit floating-point, a multiplexer 382 selects the output of the adder 380 for an input to a FP32 left shift unit 356.

Figure 4:
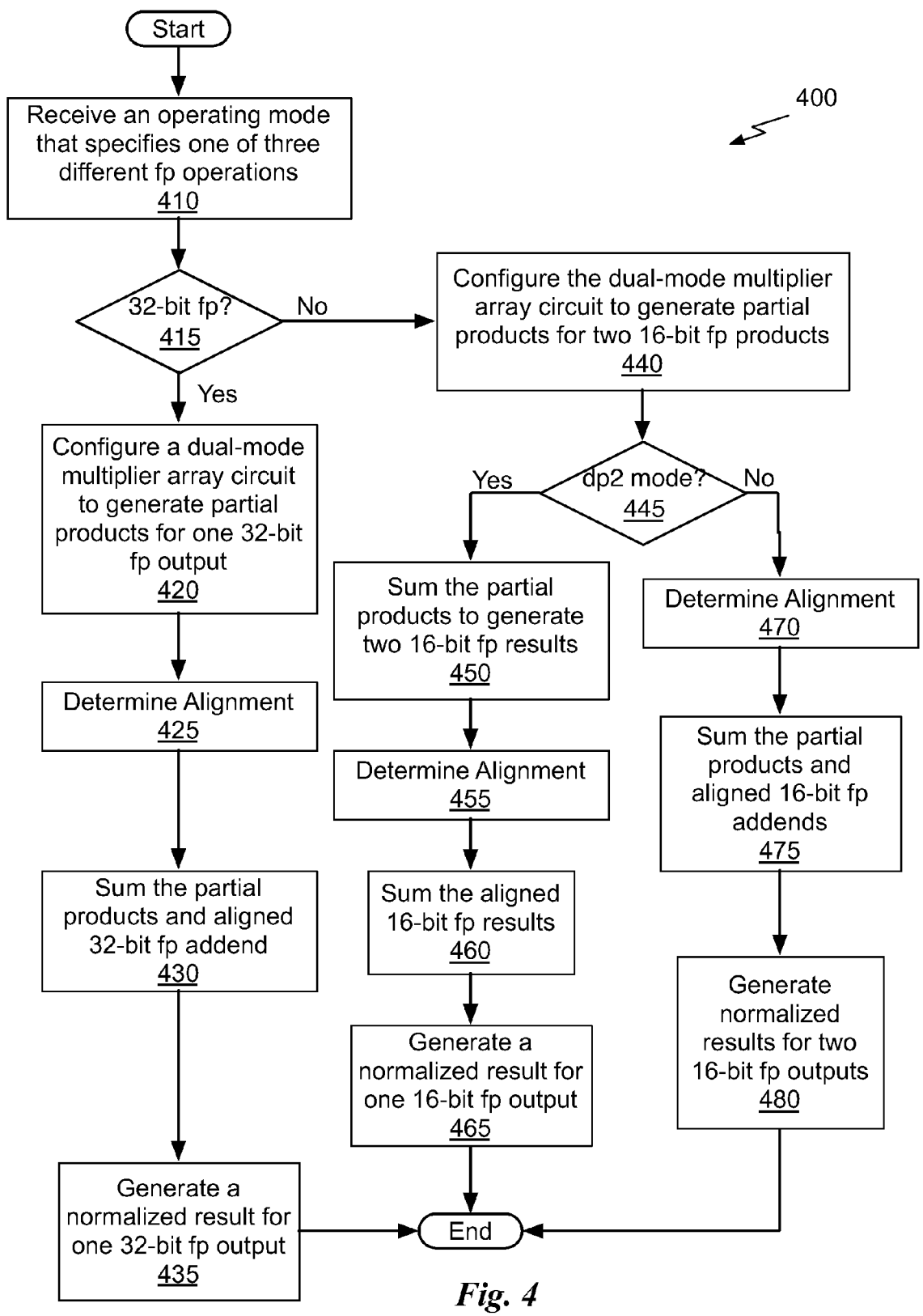
FIG. 4 illustrates another flowchart of a method for performing 32-bit or dual 16-bit floating-point operations using logic circuitry, in accordance with one embodiment.

FIG. 4 illustrates another flowchart of a method 400 for performing 32-bit or dual 16-bit floating-point (fp) operations using logic circuitry, in accordance with one embodiment. At step 410, the dual-mode floating-point arithmetic unit 200 receives an operating mode that specifies one of three different floating-point operations (e.g., 32-bit floating-point MAC, dual 16-bit floating-point MAC, and 16-bit floating-point DP).

At step 415, the dual-mode floating-point arithmetic unit 200 determines the operating mode performs 32-bit floating-point operations, and, if so, at step 420, a dual-mode multiplier array unit 250 within the dual-mode floating-point arithmetic unit 200 is configured to generate partial products for one 32-bit floating-point output. At step 425, a dual-mode exponent compare unit 205 within the dual-mode floating-point arithmetic unit 200 determines an alignment for a 32-bit floating-point addend and an aligned addend is produced by a dual-mode shift unit 206. At step 430, a dual-mode compressor 260 (or 262) and dual-mode carry propagate adder 310 within the dual-mode floating-point arithmetic unit 200 is configured to sum the partial products and the aligned 32-bit floating-point addend to produce a result corresponding to a 32-bit floating-point output. At step 435, a post-normalization unit 270 within the dual-mode floating-point arithmetic unit 200 is configured to indicate the number of leading zeros in the result and generate a normalized mantissa and an exponent adjustment unit 275 generates a final exponent for the 32-bit floating-point output.

If, at step 415, the dual-mode floating-point arithmetic unit 200 determines the operating mode performs 16-bit floating-point operations, then, at step 440, a dual-mode multiplier array unit 250 within the dual-mode floating-point arithmetic unit 200 is configured to generate partial products for two 16-bit floating-point products. At step 445, the dual-mode floating-point arithmetic unit 200 determines if the operating mode performs 16-bit floating-point DP operations, then, at step 450, a dual-mode compressor 262 within the dual-mode floating-point arithmetic unit 200 is configured to sum the partial products to produce two products.

At step 455, a dual-mode exponent compare unit 205 within the dual-mode floating-point arithmetic unit 200 determines an alignment for the two products and aligned products are produced by a dual-mode shift unit 206 or a DP2 compressor and shift unit 324. At step 460, a DP2 compressor and shift unit 324 and dual-mode carry propagate adder 310 within the dual-mode floating-point arithmetic unit 200 are configured to sum the aligned products to produce a result corresponding to a 16-bit floating-point output. At step 465, a post-normalization unit 270 within the dual-mode floating-point arithmetic unit 200 is configured to indicate the number of leading zeros in the result and generate a normalized mantissa and an exponent adjustment unit 275 generates a final exponent for one 16-bit floating-point output corresponding to the sum of the aligned products.

If at step 445, the dual-mode floating-point arithmetic unit 200 determines that the operating mode does not perform 16-bit floating-point DP operations, then, at step 470, a dual-mode exponent compare unit 205 within the dual-mode floating-point arithmetic unit 200 determines an alignment for a 16-bit floating-point addend and an aligned addend is produced by a dual-mode shift unit 206. At step 475, a dual-mode compressor 260 (or 262) and dual-mode carry propagate adder 310 within the dual-mode floating-point arithmetic unit 200 are configured to sum the partial products and the aligned 16-bit floating-point addend to produce a result corresponding to two 16-bit floating-point outputs. At step 480, a post-normalization unit 270 within the dual-mode floating-point arithmetic unit 200 is configured to indicate the number of leading zeros in each of the two mantissas corresponding to the two 16-bit floating-point outputs, and generate two normalized mantissas. An exponent adjustment unit 275 generates two final exponents for the two 16-bit floating-point outputs.

In other embodiments, the dual-mode floating-point arithmetic unit 200 may be configured to perform other floating-point arithmetic operations using the existing logic circuitry. When the floating-point operation being performed allows for a portion of the logic circuitry to be disabled, the power consumption of the dual-mode floating-point arithmetic unit 200 may be reduced. A power reduction resulting from dynamically disabling portions of the logic circuitry within the dual-mode floating-point arithmetic unit 200 is opportunistic and does not reduce the accuracy of the output. The computations performed by the dual-mode floating-point arithmetic unit 200 conform to the IEEE specified rounding and internal precision.

Figure 5:
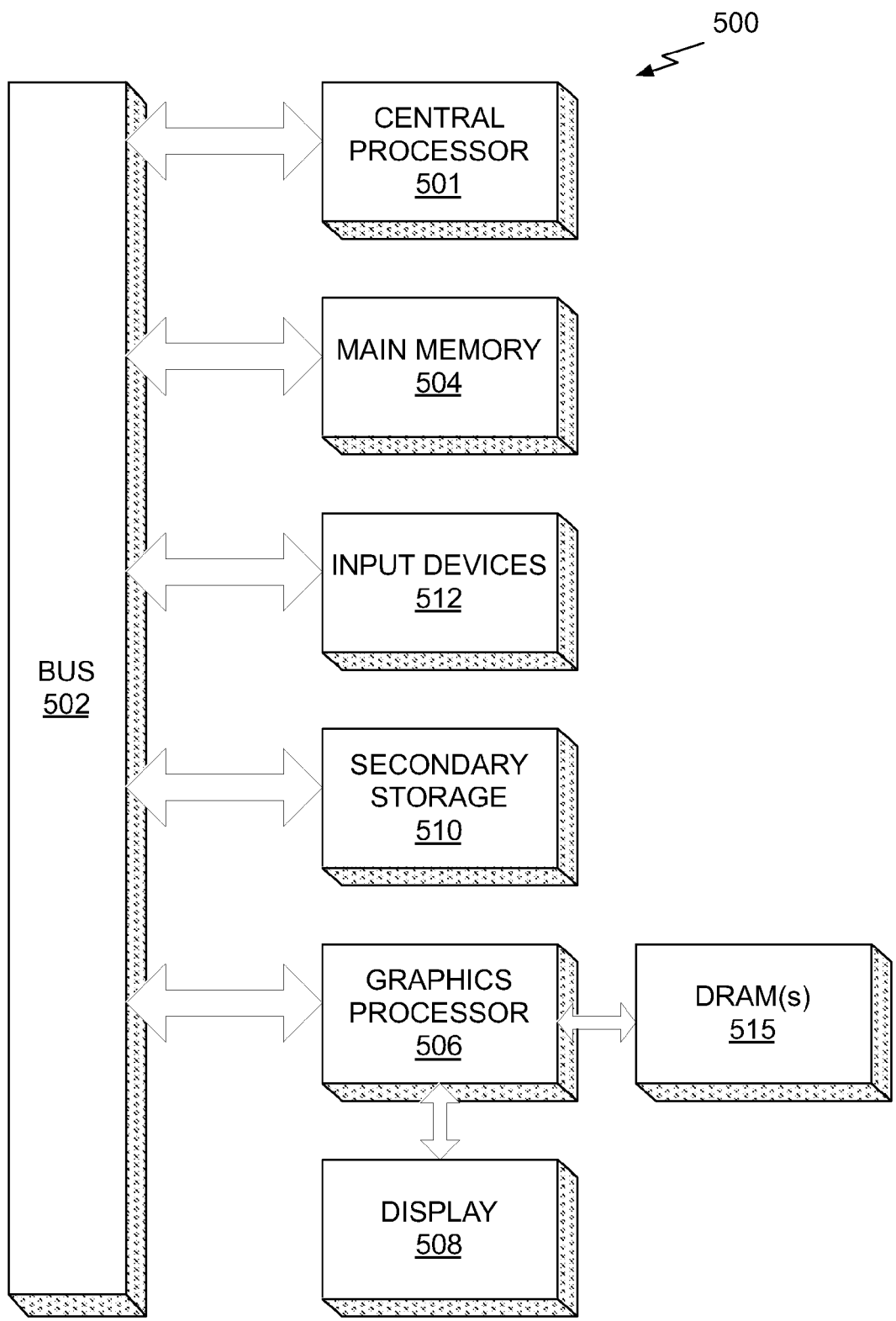
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, e.g., a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU). The graphics processor 506 may be coupled to one or more DRAM devices 515 and may be configured to refresh different regions of the DRAM(s) at different rates based on characterization information. In one embodiment, the central processor 501 is coupled to one or more DRAM devices 515 and is configured to refresh different regions of the DRAM(s) at different rates based on characterization information.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 504 and/or the secondary storage 510. Such computer programs, when executed, enable the system 500 to perform various functions. The main memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a dual-mode floating-point arithmetic circuit, an operating mode for a multiplication operation, wherein the operating mode is one of a 32-bit floating-point multiply-accumulate mode and a dual 16-bit floating-point mode dot-product mode, wherein power consumption of the dual-mode floating-point arithmetic circuit is reduced by:
 disabling one of two exponent compare circuits when the operating mode is the dual 16-bit floating-point mode dot-product mode, or
 disabling a first leading zero detection circuit when a second leading zero detection circuit indicates a portion of an exponent is all zeros;
determining, by dual-mode booth encoder circuits within a dual-mode multiplier array circuit, based on the operating mode, nine recoding terms for a mantissa of at least one floating-point input operand;
computing, by the dual-mode multiplier array circuit that is configurable to generate partial products for either one 32-bit floating-point result or for two 16-bit floating-point results, the partial products based on the nine recoding terms; and
processing the partial products to generate an output based on the operating mode.

2. The method of claim 1, further comprising, before determining the nine recoding terms, inserting a zero between mantissas of two 16-bit floating-point input operands.

3. The method of claim 1, wherein the operating mode is a dual 16-bit floating-point multiply-accumulate mode and power consumption of the dual-mode floating-point arithmetic circuit is reduced by disabling a portion of the dual-mode multiplier array circuit.

4. The method of claim 1, wherein the multiplication operation computes a sum of a product and an addend.

5. The method of claim 1, wherein the multiplication operation computes a sum of two products.

6. The method of claim 1, further comprising, before computing the partial products, inserting two zeros between two additional mantissas of two additional 16-bit floating-point input operands to produce a packed multiplicand.

7. The method of claim 6, further comprising summing the packed multiplicand with the packed multiplicand shifted left to generate three times each of the two additional mantissas.

8. The method of claim 1, further comprising:
identifying a first number of leading zeros in a most-significant portion of an un-normalized mantissa of the one 32-bit floating-point result;
identifying a second number of leading zeros in a less-significant portion of the un-normalized mantissa of the one 32-bit floating-point result; and
summing the first number and the second number when all bits in the most-significant portion of the un-normalized mantissa are zero.

9. The method of claim 8, further comprising:
shifting the un-normalized mantissa by the sum of the first number and the second number when all bits in the most-significant portion of the un-normalized mantissa are zero; or
shifting the un-normalized mantissa by the first number when all bits in the most-significant portion of the un-normalized mantissa are not zero.

10. The method of claim 1, wherein a first four of the nine recoding terms is used to produce a first 16-bit floating-point result of the two 16-bit floating-point results and a second four of the nine recoding terms is used to produce a second 16-bit floating-point result of the two 16-bit floating-point results.

11. A processing unit, comprising:
arithmetic logic circuitry configured to:
receive an operating mode for a multiplication operation, wherein the operating mode is one of a 32-bit floating-point multiply-accumulate mode and a dual 16-bit floating-point mode dot-product mode, wherein power consumption of the arithmetic logic circuitry is reduced by:
disabling one of two exponent compare circuits when the operating mode is the dual 16-bit floating-point mode dot-product mode, or
disabling a first leading zero detection circuit when a second leading zero detection circuit indicates a portion of an exponent is all zeros;
determine, by dual-mode booth encoder circuits within a dual-mode multiplier array circuit, based on the operating mode, nine recoding terms for a mantissa of at least one floating-point input operand;
compute, by the dual-mode multiplier array circuit that is configurable to generate partial products for either one 32-bit floating-point result or for two 16-bit floating-point results, the partial products based on the nine recoding terms; and
process the partial products to generate an output based on the operating mode.

12. The processing unit of claim 11, wherein the arithmetic logic circuitry is further configured to insert a zero between the two mantissas of the 16-bit floating-point input operands before determining the nine recoding terms.

13. The processing unit of claim 11, wherein the operating mode is a dual 16-bit floating-point multiply-accumulate mode and power consumption of the arithmetic logic circuitry is reduced by disabling a portion of the dual-mode multiplier array circuit.

14. The processing unit of claim 11, wherein the multiplication operation computes a sum of a product and an addend.

15. The processing unit of claim 11, wherein the multiplication operation computes a sum of two products.

16. The processing unit of claim 11, wherein the arithmetic logic circuitry is further configured to insert two zeros between two additional mantissas of two additional 16-bit floating-point input operands to produce a packed multiplicand before computing the partial products.

17. The processing unit of claim 16, wherein the arithmetic logic circuitry is further configured to sum the packed multiplicand with the packed multiplicand shifted left to generate three times each of the two additional mantissas.

18. The processing unit of claim 11, wherein the arithmetic logic circuitry is further configured to:
identify a first number of leading zeros in a most-significant portion of an un-normalized mantissa of the one 32-bit floating-point result;
identify a second number of leading zeros in a less-significant portion of the un-normalized mantissa of the one 32-bit floating-point result; and
sum the first number and the second number when all bits in the most-significant portion of the un-normalized mantissa are zero.

19. The processing unit of claim 11, wherein the arithmetic logic circuitry is further configured to use a first four of the nine recoding terms to produce a first 16-bit floating-point result of the two 16-bit floating-point results and use a second four of the nine recoding terms to produce a second 16-bit floating-point result of the two 16-bit floating-point results.

20. A system, comprising:
a memory; and
a processing unit, comprising:
arithmetic logic circuitry configured to:
receive an operating mode for a multiplication operation, wherein the operating mode is one of a 32-bit floating-point multiply-accumulate mode and a dual 16-bit floating-point mode dot-product mode, wherein power consumption of the arithmetic logic circuitry is reduced by:
disabling one of two exponent compare circuits when the operating mode is the dual 16-bit floating-point mode dot-product mode, or
disabling a first leading zero detection circuit when a second leading zero detection circuit indicates a portion of an exponent is all zeros;
determine, by dual-mode booth encoder circuits within a dual-mode multiplier array circuit, based on the operating mode, nine recoding terms for a mantissa of at least one floating-point input operand;

compute, by the dual-mode multiplier array circuit that is configurable to generate partial products for either one 32-bit floating-point result or for two 16-bit floating-point results, the partial products based on the nine recoding terms; and process the partial products to generate an output based on the operating mode.

\* \* \* \* \*